United States Patent Office 3,362,269
Patented Jan. 9, 1968

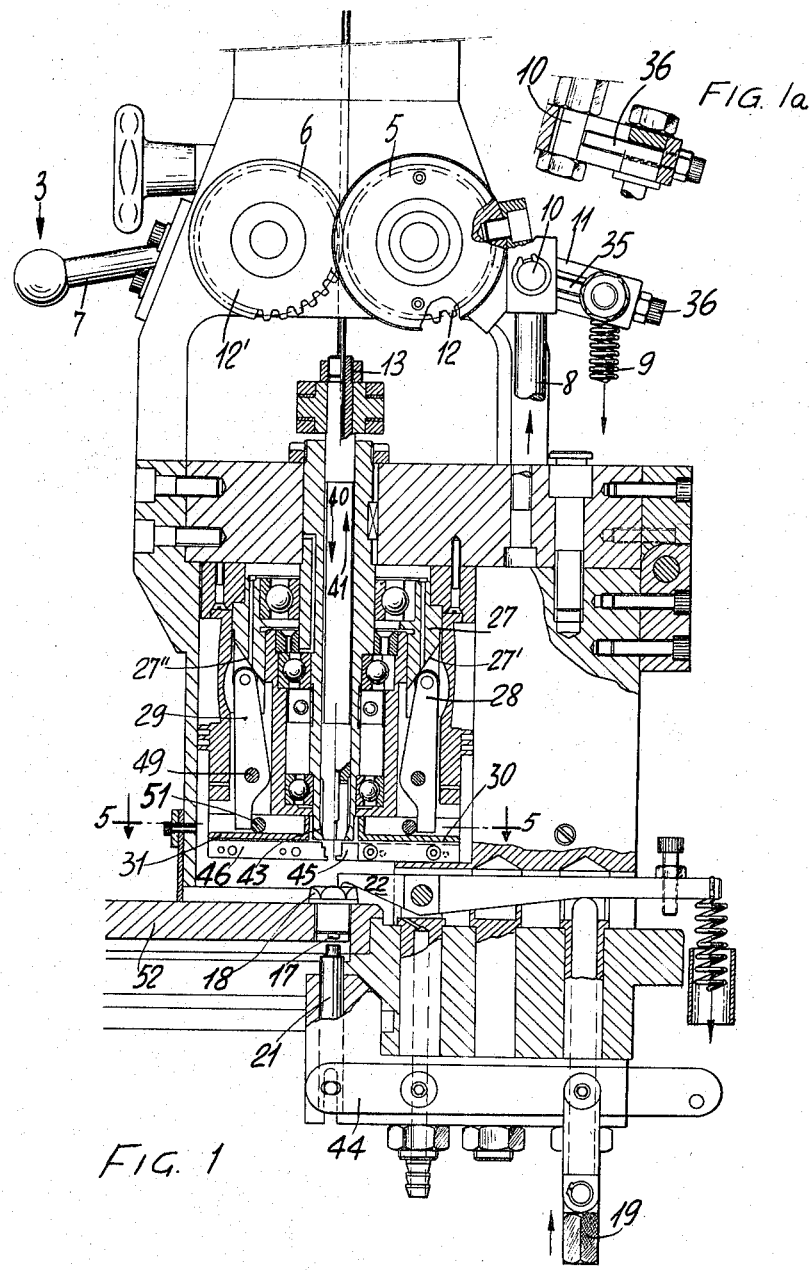

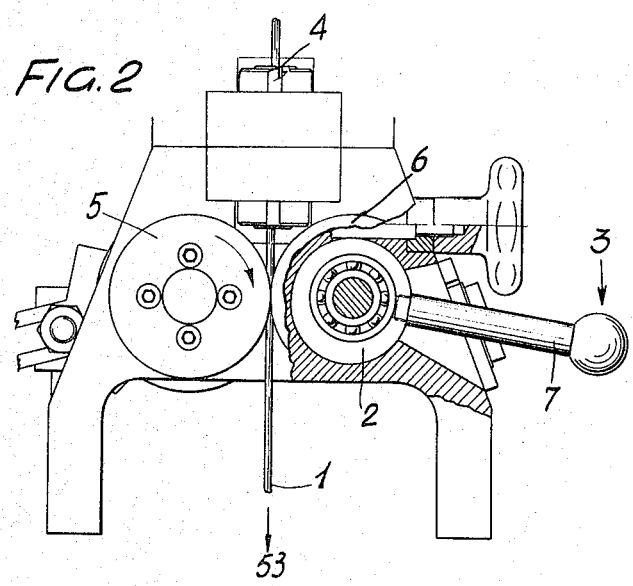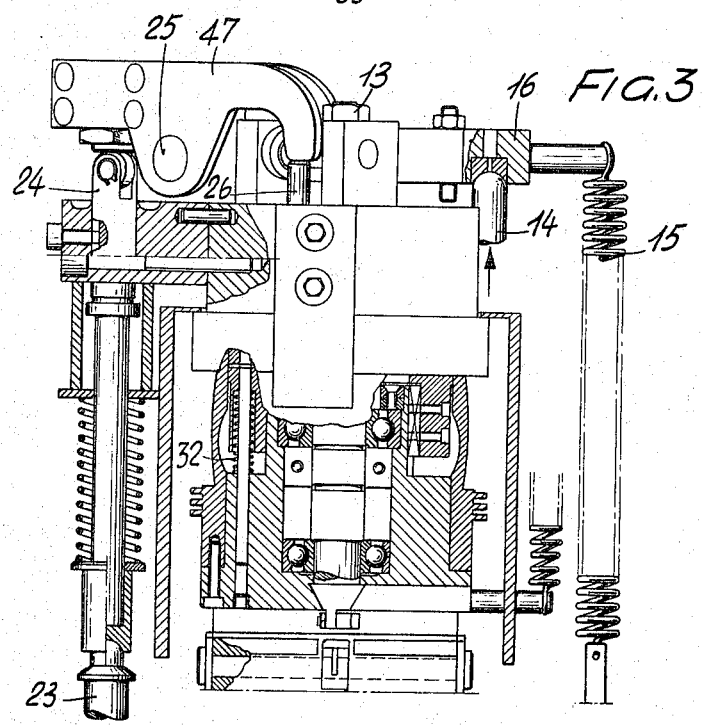

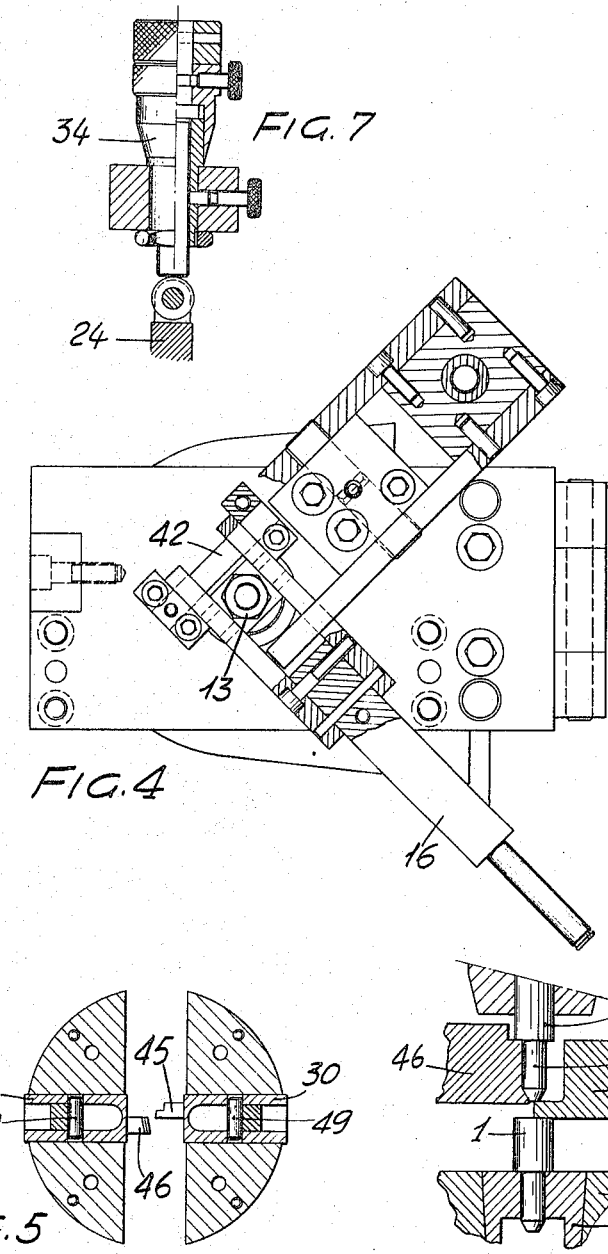

3,362,269
APPARATUS FOR FEEDING WIRE AND FOR SHAPING AND CUTTING OFF SMALL WORKPIECES THEREFROM
Guido Bertoglio, Via Agli Orti, Lugano, Viganello, Switzerland
Filed Mar. 22, 1965, Ser. No. 441,693
Claims priority, application Switzerland, June 6, 1964, 7,419/64
1 Claim. (Cl. 82—2.5)

ABSTRACT OF THE DISCLOSURE

Wire is fed by a pair of rolls that oscillate about parallel axes and grip the wire between them to advance the wire stepwise. A chuck grips the wire intermittently to prevent retrograde movement. A lever oscillates the rolls through a mechanism pivotally interconnected with the lever. The point of pivotal connection is adjustable along the lever by a vernier, so as to adjust the throw of the lever and hence the rate of wire feed.

---

The present invention relates to a device for the automatic feeding of small cylindrical workpieces cut from wire in a machine for manufacturing ball pen points or for carrying out similar operations.

The device of the present invention is characterized by:

A group of members adapted to rotate with an oscillatory movement of adjustable angular amplitude said members being intended to feed a section of straightened wire which is as long as the small cylinder to be cut;

A head which is rotatable about an axis that is parallel to the wire axis, said head being provided with at least two shaped radial tools mounted on slides provided with a radial feeding movement which is micrometrically adjustable also in motion to contemporaneously effect, the one, the reduction of the outer diameter and the possibly desired shaping of the small cylinder in the section which is to be gripped by the corresponding self-centering chuck of the machine to be fed and the other one the cutting of said wire, whereby the masses of said tools with the relative slides are balanced with respect to the rotation axis, the centrifugal forces acting upon said tools and said slides being partially compensated by the counteracting centrifugal forces exerted on the control levers of said slides, the resulting force being sufficient for moving a slide away, from the other one without overloading the surface that the end of said levers press against.

The accompanying drawings show a preferred embodiment of the device of the invention.

FIG. 1 is an axial section of the device as a whole but without the upper portion adapted to straighten the wire.

FIG. 1a is a plan view of an adjacent fragment of FIG. 1.

FIG. 2 is a partial section of the members controlling the feeding of the wire.

FIG. 3 is an axial section through the rotatable head with the moving control devices for the tool carrying slides.

FIG. 4 is a plan view of the structure of FIG. 2.

FIG. 5 is the cross section of the rotatable head taken along the plane of FIG. 1.

FIG. 6 is a greatly enlarged view showing the detail operation of the cutting of a small cylindrical workpiece.

FIG. 7 is a detail view of the micrometric adjustment device for the tools.

The wire 1 to be cut into small cylinders and then suitably shaped (FIGS. 1, 2 and 6) comes from a non-represented conventional straightening device, passes through the upper hole 4 (FIG. 2) and thence to the rollers 5–6 (FIGS. 1 and 2) mounted on eccentric bushes such as bush 2 (FIG. 2) acted upon by lever 7, the manual displacement thereof, in the direction of arrow 3, serving to grip the wire between said rollers 5–6.

Said rollers perform an oscillatory movement, the length of which is micrometrically adjustable as it will be explained hereinafter so as to provide for the stepwise feeding of the wire in the direction of arrow 40 corresponding to the length of the small cylinder to be cut from said wire.

The oscillatory movement of the rollers 5–6 is controlled by a non-represented cam actuating the tappet 8 (FIG. 1) while the spring 9 acts in opposition to said displacements.

The cam and the tappet 8 provide for the actuation of the arm 11 which, through the gears 12–12', communicates the intermittent stepwise movement to said two rollers 6–5. Each advancing movement of said rollers provides for the feeding of a corresponding length of the small cylinder to be cut.

By displacing the journal point 10 of arm 11 along the slot 35 by means of the screw 36 it is possible to obtain the desired feeding length and thus a small cylinder of a length which may be micrometrically adjusted.

The wire coming from the rollers 5–6 enters into the collet 13 which is adapted to move vertically up and down in the sense of the two arrows 40–41. This operation is provided by the tappet 14 which is opposed by the recall spring 15 (FIG. 3).

The upward movement of the tappet 14 provides for the lifting of the arm 16 which is pivoted at 42 (FIG. 4) and therefore for the upward displacement of the collet 13 in the direction of arrow 41.

The collet 13, moving upwards, gets free from the lower cone 43 (FIG. 1), thereby releasing the wire 1 which is thus in a position to move downwards. When the wire 1 acted upon by the feeding rollers 5–6 moves downwards in the direction of the arow 40, the lower end of the collet 13 closes against the cone 43 thereby tightly engaging the wire 1 which may then be shaped and cut by the two tools 46 and 45 (see also the detail view of FIG. 6). The worked small cylinder which presents the portion 1' having a reduced diameter (FIG. 6) is adapted to enter into the chuck 18 (FIGS. 1 and 6) situated below which is a part of the machine to be fed with the wire, for performing other required operations thereon.

By operating the lever 44 the tappet 19 (FIG. 1) which is counteracted by a return spring provides for the moving upwards of the pusher 21 which opens the chuck 18 while the lever 22 situated above, is adapted to close said chuck to hold the part 1' of the cut cylinder (FIG. 6).

The two movements of the levers 44 and 22 are synchronized by means of a non-represented cam.

The most important part ot the device of the invention is the rotatable head shown in FIG. 1 and carrying the tools 45–46 mounted on slides 30–31. The adjustment in motion of the final position of the above mentioned tools occurs by means of the tappet 23 (FIG. 3) which by pushing the piston 24 actuates the lever 47. Said lever 47 is pivoted about 25 and presses with its other end on the two pins 26 to transfer the movement to the control body 27 (FIG. 1).

The control body 27 has two inclined surfaces 27'–27" acting upon the end rollers of the two levers 28–29 which are pivoted at 48–49 and act with their other ends on the two above mentioned slides 30–31 carrying the tools 45–46. When the body 27 with its two inclined surfaces 27′–27″ moves downwards, the two levers 28–29 act upon the two slides 30–31 in such a direction as to have the tools 45–46 approach the rotation axis, tool 45 for effecting the reduction of the wire diameter in the section 1′ (FIG. 6) and tool 46 for contemporaneously cutting the wire.

The return of the body 27 to the initial position i.e. upwards is provided by the springs 32 (FIG. 3) as well as by the centrifugal force developed by the rotating slides 30–31. To avoid excessive pressure on the inclined surfaces 27′–27″ it is necessary to partially compensate the centrifugal force acting on the slides 30 and 31 by means of the levers 28, 29 which having a longer arm and a larger mass in their upper portion (i.e. above pivots 48–49) are in a position to partially balance the centrifugal force exerted on the slides.

When the control body 27 is located in its uppermost position the tool-carrying slides 30 and 31 are at their greatest reciprocal distance thereby allowing the wire 1 to move downwards to get ready for a new cycle.

To fix the final diameter of the reduced portion 1′ (FIG. 6) it suffices to adjust accordingly the vernier screw 34 (FIG. 7) which accordingly pushes more or less the piston 24 shown in FIG. 3.

A very important feature of the invention consists in the particular arrangement of the masses of the two slides 30–31 with the relative tools which must be perfectly balanced and radially opposed so that, even while rotating at very high speed, they do not cause any vibration which would impair the perfect execution of the operations. Similarly important is the above mentioned compensation of the centrifugal force as explained above.

The rotation is imparted to the body 27 by a non-represented motor through a belt acting on a pulley.

The conventional illustrated devices (such as cams, tappets, levers, etc.) may be obviously replaced by equivalent means (pneumatic or hydraulic pistons, etc.) without thereby departing from the spirit of the present invention.

What is claimed is:

1. Apparatus for advancing a length of wire and for shaping and cutting workpieces of predetermined length from the wire, comprising a work-gripping chuck, means for intermittently actuating said chuck, a pair of opposed feed rolls for the wire, means mounting the feed rolls for rotation about parallel axes, lever means for oscillating said rolls about their axes, control means for oscillating said lever means in timed relation to said chuck to advance the wire stepwise by equal increments of length, means selectively to vary the throw of the lever means thereby to regulate the lentgh of said increments, said varying means comprising a pivotal connection between said lever means and said oscillating means, vernier screw means for shifting said connection along said lever means, and means for shaping and cutting workpieces from the advanced length of wire.

References Cited

UNITED STATES PATENTS

| 539,964 | 5/1895 | Spencer | 82—2.5 X |
| 549,109 | 11/1895 | Crombie | 82—2.5 X |
| 2,619,174 | 11/1952 | Neale | 82—2 X |

FOREIGN PATENTS

| 583,407 | 10/1924 | France. |
| 579,370 | 6/1933 | Germany. |

LEONIDAS VLACHOS, *Primary Examiner.*